Feb. 3, 1931.   F. J. McDEVITT   1,791,102
RECLAIMING APPARATUS
Filed Dec. 15, 1927   3 Sheets-Sheet 1

INVENTOR
F.J. McDEVITT
By J.H.G.Cool
ATTORNEY

Feb. 3, 1931.  F. J. McDEVITT  1,791,102
RECLAIMING APPARATUS
Filed Dec. 15, 1927  3 Sheets-Sheet 2
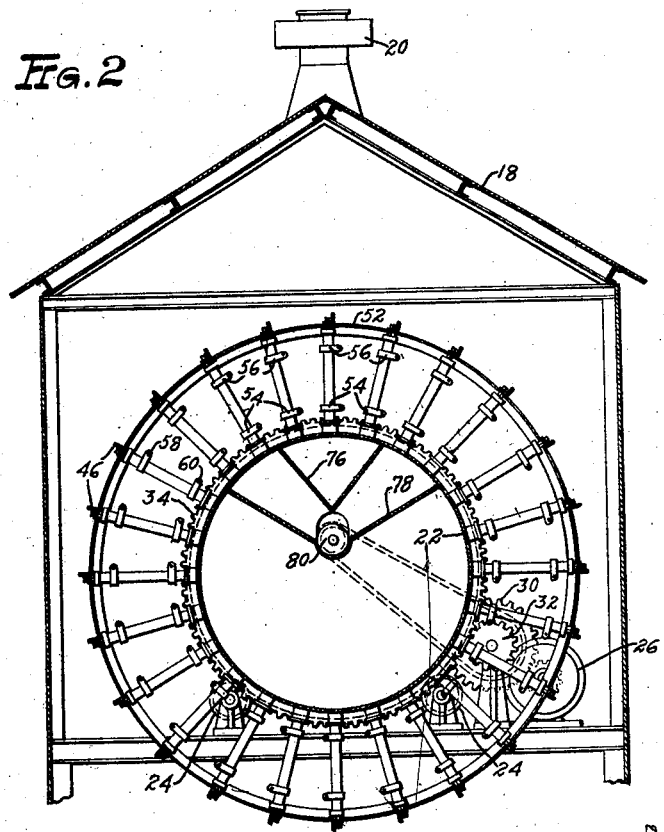
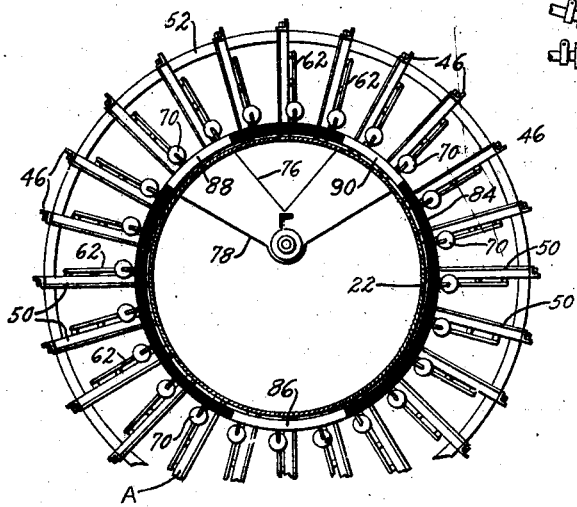
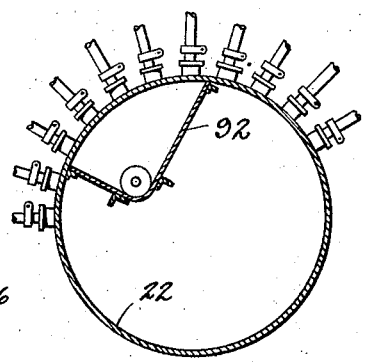
INVENTOR
F.J.McDEVITT
ATTORNEY Feb. 3, 1931.   F. J. McDEVITT   1,791,102
RECLAIMING APPARATUS
Filed Dec. 15, 1927   3 Sheets-Sheet 3
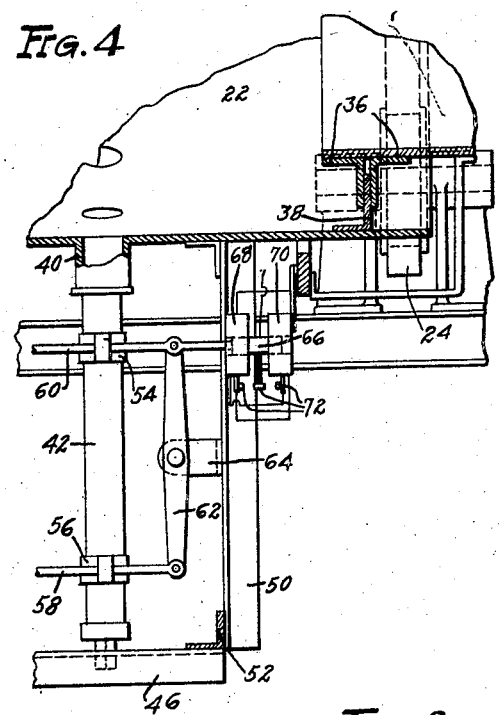
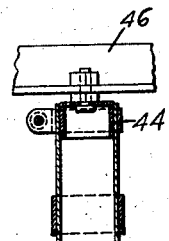
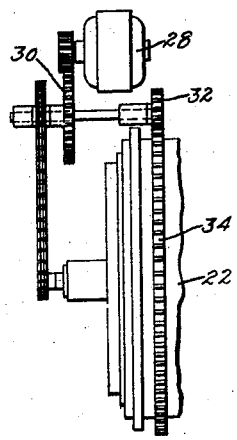
INVENTOR
F. J. McDEVITT
By J. H. S. Cook
ATTORNEY Patented Feb. 3, 1931

1,791,102

UNITED STATES PATENT OFFICE

FRANK J. McDEVITT, OF ST. LOUIS, MISSOURI

RECLAIMING APPARATUS

Application filed December 15, 1927. Serial No. 240,318.

This invention relates to reclaiming apparatus, and is illustrated herein as embodied in a reclaimer for use in separating minute solids from a gas or other medium in which they are suspended.

Of recent years pulverized fuel burners have been, and are being, installed in many of the largest industrial plants in the country. In the use of these burners a great amount of very fine ash particles is produced, which, when discharged from a chimney, will float for some distance in the air before gradually settling to the ground. Many of the larger plants discharge several tons of this finely divided material into the air during a working day, and thereby give rise to numerous complaints. The foregoing constitutes an important reason for separating the ash from the combustion products before they are discharged into the atmosphere, and another consideration which recommends such a separation resides in the fact that the ash, when once reclaimed, is a valuable product and may be employed in a number of ways, as, for example, a fertilizer, an inert gas for preventing explosions in coal mines, etc. Accordingly, the present invention has for an object thereof the provision of an improved apparatus which may be employed to separate small particles of ash from the hot products of combustion in which the ash particles are suspended.

In the illustrative embodiment of the invention the reclaimer comprises a hollow continuously rotating cylindrical drum, or shell, formed with repeated perforations for providing communication between the interior of the drum and the filter legs extending radially of the drum on the exterior surface thereof. The combustion products pass from the flue into the continuously rotating hollow drum and thence into the filter legs, where the ash is entrapped and only the gas is permitted to escape from the filters into the atmosphere. During the use of the device, the filter legs become clogged by the ash which collects upon their surfaces, and if there were not provided some means for cleaning the legs, further filtration would be rendered impossible. Accordingly, an important feature of this invention consists in the provision of means for automatically vibrating a plurality of the filter legs simultaneously, during the continuous rotation of the drum, to free them of ash collected upon their inner surfaces. As illustrated, the vibrating means comprises a solenoid connected with vibrating rods, which in turn are connected with those filter legs which are arranged to vibrate simultaneously.

Other objects and features of the invention will become apparent from a reading of the following specification in the light of the accompanying drawings, in which—

Fig. 2 is a view, in section, of the right-hand end of the reclaimer as viewed in Fig. 1;

Fig. 3 is another view, in section, of the right-hand end of the reclaimer as viewed in Fig. 1;

Fig. 4 is a detail view showing the mechanism for vibrating the filter legs of the reclaimer;

Fig. 5 is a fragmentary view illustrating the mechanism for operating the reclaimer;

Fig. 6 is a view, in section, of one form of filter leg;

Fig. 7 is a detailed view showing a modification of the reclaimer that is illustrated in the earlier Figures:

Fig. 8 is a view, in section, showing another form of filter leg; and

Fig. 9 is a fragmentary view, in section, showing still another form of filter leg.

Figure 1:
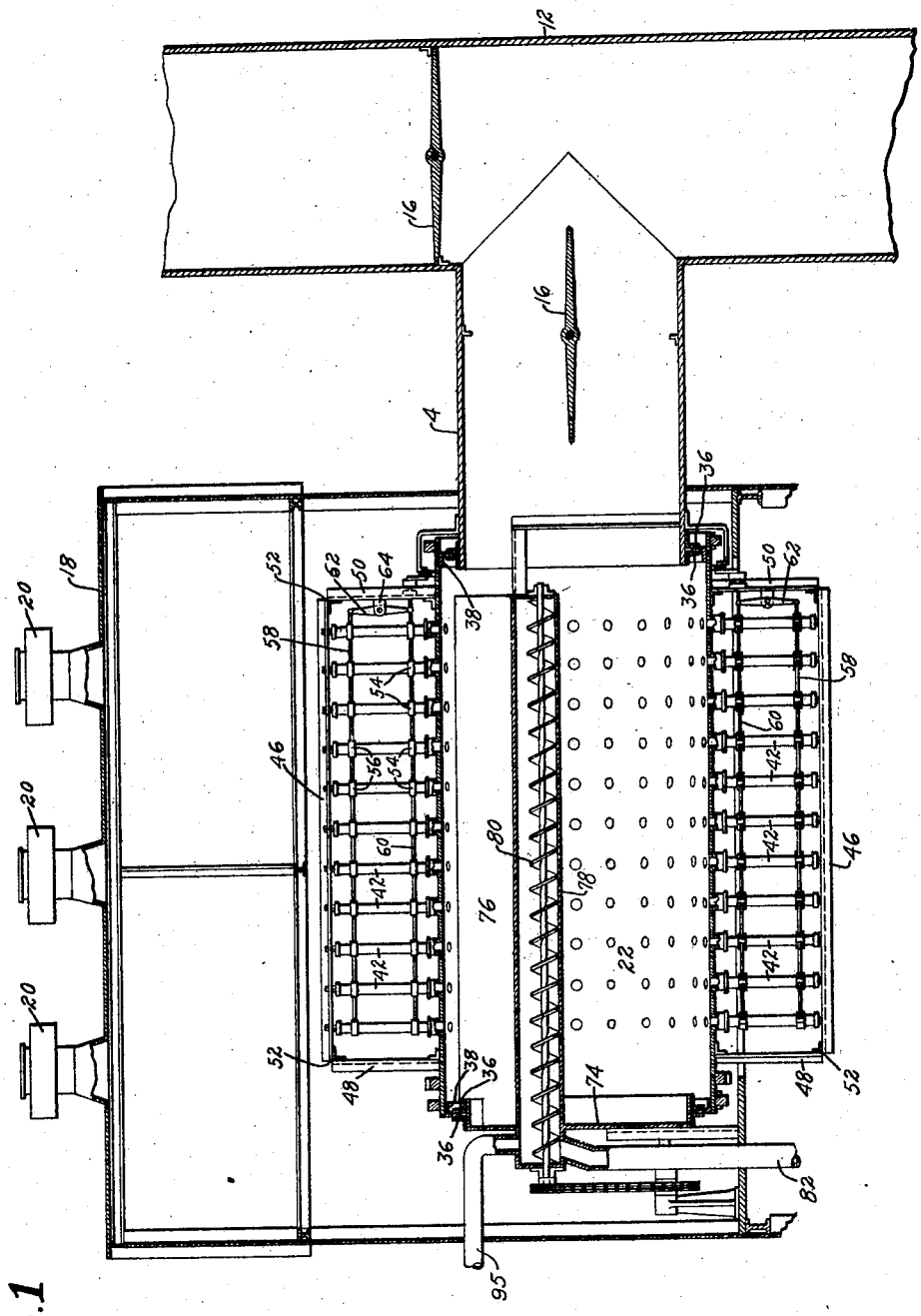
Fig. 1 is a front elevational view, in section, showing the construction of a reclaimer embodying the present invention.

As hereinbefore pointed out, the reclaiming apparatus is adapted to be used in conjunction with the flue of a pulverized fuel furnace, and accordingly, as illustrated, the flue 12 of the furnace is provided with a branch flue 4 through which the passage of the products of combustion may be controlled by means of dampers 16. The branch flue 4 is shown as extending into a housing 18 provided with a plurality of outlet flues 20—20, and the reclaimer is positioned on the floor of the housing 18.

The reclaimer comprises a cylindrical perforated drum, or shell, 22 mounted for rotation upon rollers 24 (Fig. 2) and adapted to be rotated by means of a motor 26 which drives an intermediate gear 30 which, in turn, drives a smaller gear 32 engaging with teeth 34 formed on the end of the reclaimer shell. To prevent longitudinal movement of the shell and control the rotary movement, fixed guides 36 are arranged to cooperate with flanges 38 carried by the shell 22 (Figs. 1 and 4).

As shown in Fig. 6, each of the perforations in the shell is provided with a nipple 40, over which there is adapted to be fitted a filter leg 42 composed of cloth, or some similar material. The opposite end of the filter leg is adapted to be inserted onto a cap 44, which is rigidly secured to a supporting iron 46. Turning now to Fig. 1, it will be observed that the supporting iron 46 extends lengthwise of the shell, parallel to the axis thereof, and is secured at its opposite ends by means of supporting bars 48—50 located at opposite ends of the shell. Circular reinforcing ribs 52 encompass the shell at the point of junction between the supporting irons 46 and the rods 48—50. These circular reinforcing ribs 52 provide means for spacing equally in a radial plane the ends of the filter legs 42.

From so much of the description as has already been given, it will be appreciated that in the operation of the device the products of combustion pass from the flue 12 into the rotary drum, or shell, 22 and through the perforations formed in the drum into the closed filter legs 42, whereupon the gas exudes through the filter cloth, or fabric, and the ash collects upon the inside surface of the cloth. It has been hereinbefore pointed out that the apparatus is provided with means for cleaning periodically the interior surface of the filter cloth, and the following few paragraphs will be devoted to a description of the improved cleaning means and of mechanism for carrying the separated ash out of and away from the reclaimer.

As shown in Figs. 1, 2 and 4, each of the filter legs 42 is provided with an inner collar 54 and an outer collar 56. An outer vibrating rod 58 is arranged to be connected with those outer collars 56 which are connected to a longitudinally extending row of filter legs, and an inner vibrating rod 60 is secured to the inner collars of the same row, the two rods being secured at one end to a rocker arm 62, which is pivoted at 64 to the supporting rod 50. The end of the inner vibrating rod 60 adjacent the rocker arm 62 is extended and has formed on its outer extremity the armature, or core, 66 of a solenoid. The coils 68—70 of the solenoid are carried by the supporting rod 50 and are spaced apart to provide means whereby the coils may be alternately energized to reciprocate the core 66 and vibrate the rod 60. Contact members 72 serve to connect the coils 68—70 alternately with a source of electricity. By means of the mechanism just described, all of the filter legs constituting a longitudinal row will be vibrated upon electrical energy being supplied to the solenoid which is associated with each of the longitudinal rows. Thus it will be seen that if a longitudinal row of filter legs is vibrated during a complete rotation of the shell, the ash within the filter legs will tend to be jarred to the closed bottom of the legs as they pass through the lower portion of the housing 18, and to be knocked outwardly into the hollow interior of the shell as they pass through the upper portion of the housing. However, the inrushing products of combustion prevent the ash from falling outwardly into the shell, and it will thus be seen that, if some provision were not made to remedy the situation, the ash would collect in the bottom of the filter legs until all of the legs were full, whereupon further filtration would be rendered impossible and the reclaimer inoperative.

In view of the foregoing considerations, the apparatus is provided with means for cleaning out all of the filter legs during each rotation of the screen, or drum, 18. As illustrated, the left-hand end of the screen, as viewed from the front in Fig. 1, is closed by means of a closure member 74, and extending lengthwise of the interior of the shell there is a V-shaped trough, composed of a cover 76 and a bottom 78, having both of its ends closed. The trough is stationarily mounted in the interior of the shell, and the open sides of the trough are in immediate proximity to the rotating inner surface of the shell 22. By means of such an arrangement the incoming gases are excluded from the interior of the trough, and as the ends of the various filter legs pass across the openings in the trough the ash collected therein is free to fall into the trough and be carried away. A rotary screw conveyor 80 extends lengthwise throughout the trough and carries the collected ash forwardly and projects it into a discharge pipe 82.

There is no need for constantly vibrating the rows of filter legs as they rotate with the hollow drum 22, and accordingly, as illustrated in Fig. 3, a stationary collector ring 84 for energizing the solenoids carried by the rows of filter legs is insulated, except for one portion 86 located adjacent to the bottom of the housing 18 and a plurality of portions 88—90 which coincide with the openings in the trough formed between the top 76 and the bottom 78.

For the purpose of convenience, the operation of the reclaimer will be described with particualr reference to the operation of one of the rows of filter legs, it being understood that each of the rows of legs is vibrated independently of the remaining rows, but in a manner exactly similar thereto. Upon starting the motor 26 rotation is imparted to the shell 22 and to the rotary screw conveyor 80.

Looking now at Fig. 3, a row of filter legs such as that indicated by the reference character A will move clockwise with the shell without vibration (owing to the insulation carried by the collector ring), and will collect and filter the hot products of combustion until the solenoid carried by the row A is energized by the exposed portion 88 of the collector ring, whereupon the legs of the row vibrate rapidly and discharge the ash collected on their inner surfaces into one of the open sides of the conveyor trough. The row of legs will then move across the upper sector of the zone of rotation without being vibrated, during which time they will entrap additional ash and then pass to the exposed portion 90 of the collector ring, whereupon they are again vibrated and caused to discharge ash collected upon their inner surfaces. After passing across the exposed portion 90 of the collector ring, the solenoid is again de-energized as the row of filter legs passes downwardly, during which time ash is constantly being gathered upon the inner exposed surface of the cloth comprising the legs. Upon approaching the bottom point in the zone of rotation, the exposed area 86 of the collector ring comes into play and causes the row of legs to be vigorously vibrated, whereupon the collected ash is knocked down into the ends of the filter legs, in which condition the ash particles will not interfere with proper filtration during the upward movement of the legs. Thus it will be seen the legs are cleaned once during each rotation by the ash being knocked downwardly into the ends of the legs, and twice by the ash being knocked downwardly out of the legs into the discharge trough.

Figs. 7, 8 and 9 show various modifications contemplated by the invention. Fig. 7 shows an arrangement in which the discharge trough is composed of a single sheet of metal 92, which is bent to form a trough having a single upper opening. With such an arrangement the various rows of filter legs are vibrated only as they pass across the bottom of the housing, and again as they pass above the trough defined by the metal plate 92. While this modification is generally satisfactory, it will be appreciated that the construction previously described permits a greater filtration area to be exposed at all times and empties the filter legs twice instead of once during each rotation.

Fig. 8 shows a modified form of filter leg in which a suitable cloth sleeve 94 is encased in a cylindrical metal screen 96. The opposite ends of both the cloth sleeve and the metal screen are suitably secured to the nipple 40 of the screen 22 and the supporting iron 46. A filter leg of this type, although including a metal screen, is generally sufficiently flexible to permit vibration to take place by the above described mechanism.

In Fig. 9 there is shown still an additional modified form of filter leg, in which a cloth, such, for example, as felt, canvas or wool, has embedded in it a wire mesh.

As shown in Fig. 1, to prevent the accumulation of pressure within the trough, which would tend to prevent the ash from falling downwardly out of the filter legs, there may conveniently be provided a suction passageway 95, for withdrawing from the trough gas that has accumulated therein owing to leakage between the various metal parts of the trough, and between the edge of the trough and the shell.

Although the invention has been described herein with particular reference to reclaiming ash from the combustion products of pulverized fuel, it is to be clearly understood that the invention contemplates being employed in many other similar reclaiming processes, such, for example, as that of reclaiming zinc, lead, and other particles from gaseous mediums in which they are suspended, etc.

Having thus described my invention, what I claim as new and desire to secure by Letters Patent of the United States is:

1. A reclaiming apparatus comprising a rotary screen having filter legs extending outwardly therefrom, and a single means associated with the screen for vibrating simultaneously a plurality of the filter legs by imparting movement to each of said filter legs at the opposite ends thereof.

2. A reclaiming apparatus comprising a rotary screen, filter legs associated with the screen, means for rotating the screen, and means rotatable with the screen for vibrating the filter legs.

3. A reclaiming apparatus comprising a rotary cylindrical shell, a plurality of filter legs extending outwardly from the shell, means carried by the shell for maintaining the filter legs in an outwardly extending position, and means rotatable with the shell for imparting periodic vibrations to the filter legs.

4. A reclaiming apparatus comprising, in combination, an elongated screen, filter legs extending outwardly therefrom, a vibrating rod secured to a plurality of the filter legs, and means comprising a solenoid for imparting vibrations to the rod, said vibrating rod and said solenoid being mounted on the screen to rotate therewith.

5. A reclaiming apparatus comprising, in combination, a rotary shell, filter legs extending outwardly from the exterior surface of the shell, the shell being perforated to provide for communication between the interior of the filter legs and the interior of the shell, means for rotating the shell, a trough located within the shell and provided with a plurality of openings, and means for vibrating the filter legs as they pass across the openings within the trough and again at a point remote from the openings in the trough.

6. A reclaiming apparatus comprising a rotary screen having filter legs extending outwardly therefrom, and a single means associated with the screen for vibrating simultaneously a plurality of the filter legs by imparting movement in opposite directions to each of said filter legs simultaneously at the opposite ends thereof.

In testimony that I claim the foregoing I hereunto affix my signature.

FRANK J. McDEVITT.